Apr. 24, 1923.
C. W. WEISS
1,452,946
TRANSMISSION DEVICE
Filed March 8, 1920
3 Sheets-Sheet 1
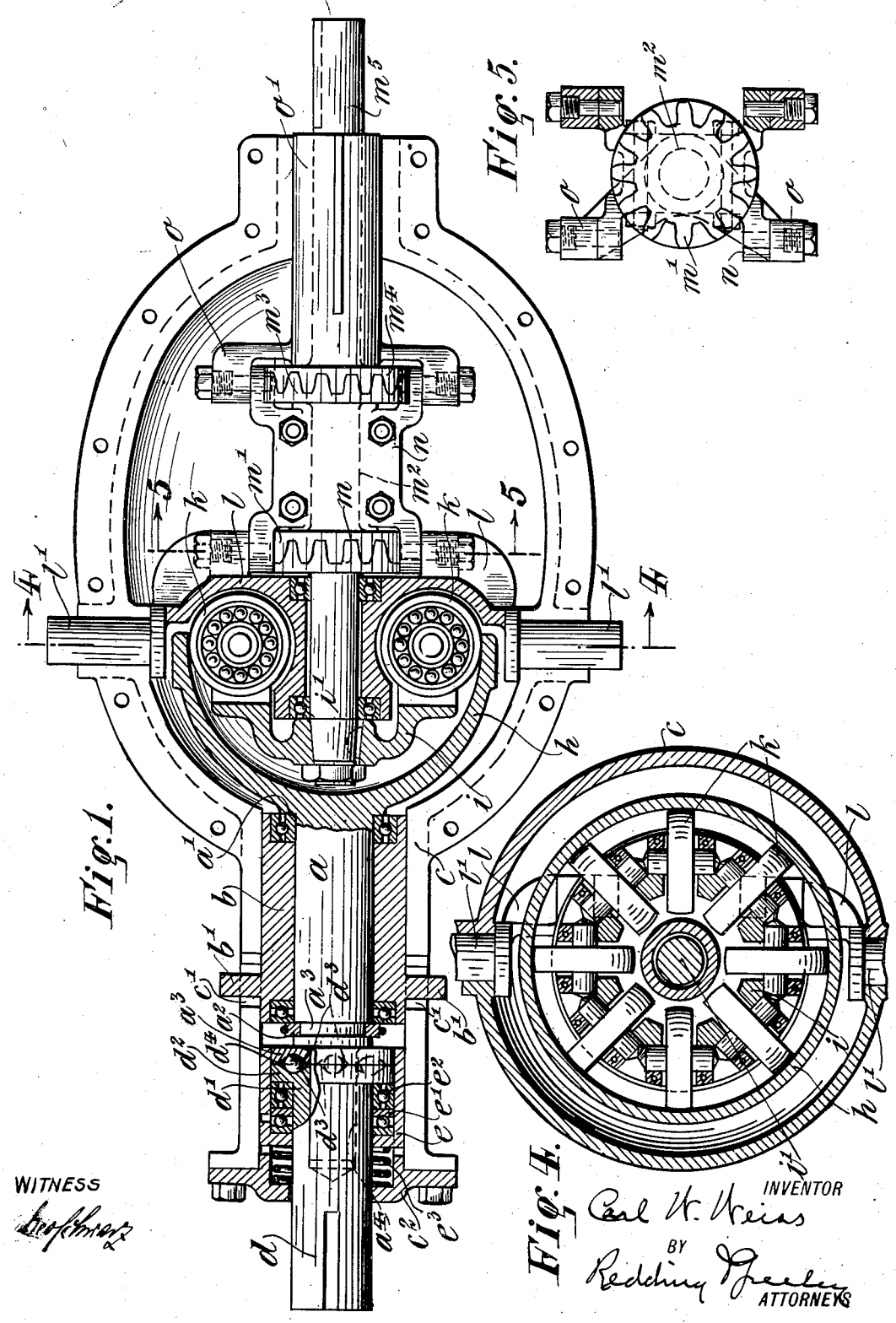
WITNESS
INVENTOR
Carl W. Weiss
BY
Redding Greeley
ATTORNEYS Apr. 24, 1923. 1,452,946
C. W. WEISS
TRANSMISSION DEVICE
Filed March 8, 1920 3 Sheets-Sheet 2
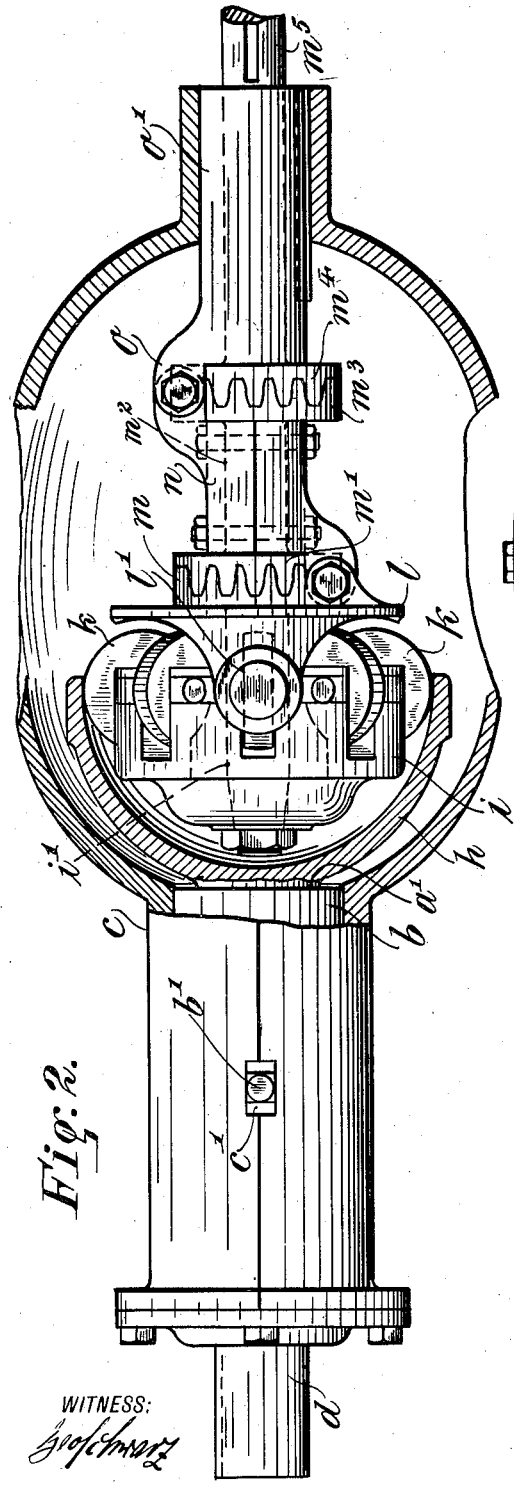
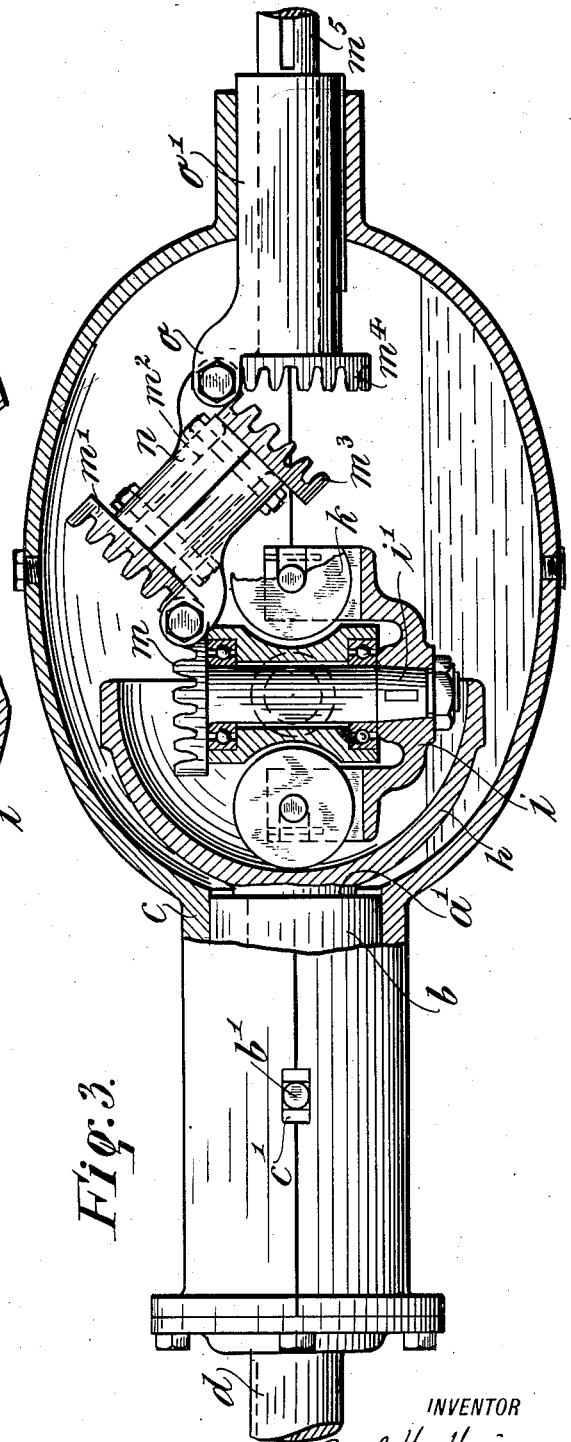
WITNESS:
INVENTOR
BY
ATTORNEYS Apr. 24, 1923.
C. W. WEISS
1,452,946
TRANSMISSION DEVICE
Filed March 8, 1920
3 Sheets-Sheet 3
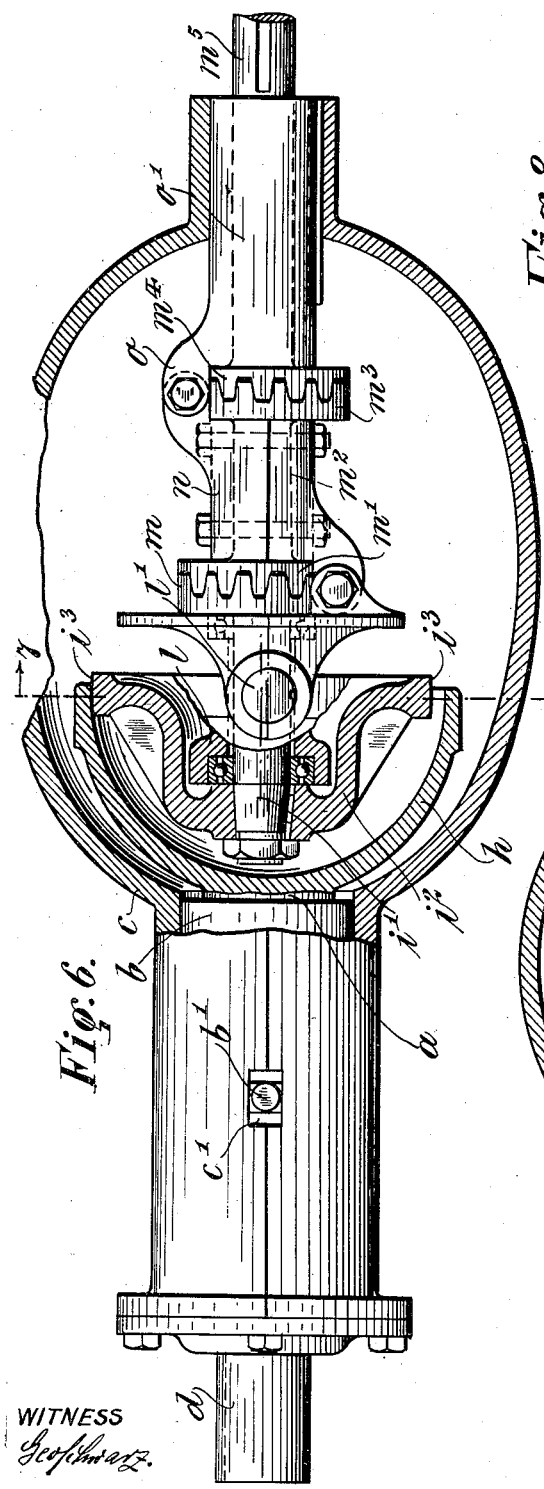
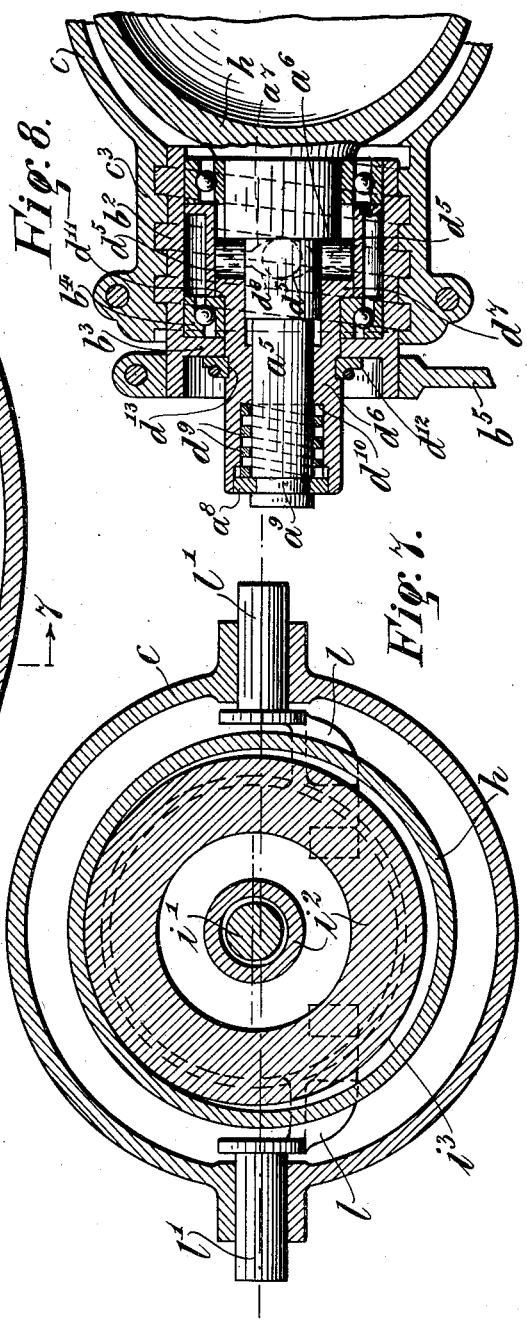
WITNESS
Geo. Schwartz.
INVENTOR
Carl W. Weiss
by Redding & Greeley
ATTORNEYS Patented Apr. 24, 1923.

1,452,946

UNITED STATES PATENT OFFICE.

CARL W. WEISS, OF BROOKLYN, NEW YORK.

TRANSMISSION DEVICE.

Application filed March 8, 1920. Serial No. 364,202.

*To all whom it may concern:*

Be it known that I, CARL W. WEISS, a citizen of the United States, whose residence is 933 East 12th Street, in the borough of Brooklyn, of the city of New York, in the State of New York, have invented certain new and useful Improvements in Transmission Devices, of which the following is a specification, reference being had to the accompanying drawing, forming a part hereof.

This invention relates to a power transmission device of the character of that shown in Letters Patent of the United States, #1,141,508, dated June 1, 1915, and #1,146,982, dated July 20, 1915, and comprising a rotatable mutor and a cooperating body concentric therewith, one of said parts having a spherical bearing surface and the other having gripping elements to co-operate therewith, with means to vary the relative angular axial position of said parts. The invention has for its primary object to improve the construction of such devices with a view to securing greater simplicity and ease in manufacturing, reduction of friction and increase in efficiency. It is concerned particularly with the means for securing and increasing in proportion to the torque the driving engagement between the two parts and with the means for transmitting motion from the nutating member to the driven shaft. In the device shown in said Letters Patent the driving engagement between the two parts is secured by providing for expansion of the internal part with respect to the external part and a consequent increase of pressure, while in the present case one part is made movable axially with respect to the other part so as to secure the required pressure of one with respect to the other and at the same time to provide for complete dis-engagement one part from the other, the means whereby these results are accomplished being located externally with respect to said parts. In the devices shown in said patents, transmission from the second part to the driven part was limited in respect of the relative angular displacement of the parts and therefore in respect of the obtainable speed ratios from 0 to less than 1:1, while in the present case the construction allows an angluar variation of 90°, that is, all speed ratios from 0 to 1:1 and a further movement beyond 90° to bring about reversal of the direction of rotation of the driven part. The improved means, which have been designed with special reference to their embodiment in transmission devices of the character referred to, are capable of use in other devices in which one member of the transmission mechanism may have a variable angular axial position with respect to the other member. The invention will be more fully explained hereafter with reference to the accompanying drawings in which it is illustrated and in which—

Figure 1 is a view mainly in longitudinal central section of a transmission device whch embodies the invention.

Figure 2 is a view of the same mainly in elevation, but with the spherical bearing member and the casing in section.

Figure 3 is a view generally similar to Figure 2 but with some parts of the transmission device in a different position and with the carrier of one member of the transmission device in section.

Figure 4 is a detailed view partly in section on the plane indicated by broken line 4—4 of Figure 1.

Figure 5 is a detailed view partly in section on the plane indicated by the broken line 5—5 of the Figure 1.

Figure 6 is a view similar to Figure 2 but illustrating the modified form.

Figure 7 is a view in section on the plane indicated by the broken line 7—7 of Figure 6.

Figure 8 is a partial view in longitudinal section illustrating a further modification.

In the embodiment of the invention illustrated in Figures 1–5 the driving part or shaft $a$ is shown as mounted for rotation in suitable bearings carried by a sleeve $b$, which is capable of receiving through the application of a lever to the pins $b'$, a limited longitudinal movement, carryng with it the shaft $a$, the sleeve and its bearings being held between a shoulder $a'$ formed on the shaft and a collar $a^2$ held in a groove $a^3$ of the shaft. The sleeve $b$ is mounted in a stationary casing $c$, formed in two parts bolted together, the pins $b'$ protruding through openings $c'$ in the neck of the casing. The end of the shaft $a$ is reduced in diameter, as at $a^4$, to enter a socket $d'$ formed therefor in the end of the driving shaft $d$ and is also formed with a flange $a^5$ to co-operate with the flanged end $d^2$ of the shaft $d$. The abutting faces of the flanges $d^2$ and $a^3$ are formed with tapered recesses $d^3$ to receive balls or rollers $d^4$, so that any tendency to relative rotation of the shaft $a$ with respect to the shaft $d$, through the rolling action of the balls $d^4$ in the tapered recesses $d^3$, tends to produce relative longitudinal movement of the two shafts, the effect of which will be explained hereinafter. Between a cap $c^2$, secured on the end of the neck of the casing $c$, and the flanged sleeve $e$, which supports suitable bearings $e'$ and $e^2$, is mounted a spring $e^3$ which presses the shaft $d$ yieldingly forward and, through the flanges and the interposed balls or rollers, also presses the shaft $a$ normally forward. The pressure of the spring $a^3$ may be overcome and the shaft $a$ withdrawn by the application of a forked lever in the usual manner to the pins $b'$.

As in the construction shown in the patents referred to, the part which co-operates with the mutor, is shown as an internally spherical bearing $h$ which in the present instance, however, instead of being stationary, is carried by and rotates with the shaft $a$.

The mutor as shown in Figures 1–4 has a frame $i$ provided with gripping elements or rollers $k$ mounted with suitable bearings on tangential axes, which, in this instance, are relatively fixed. These gripping elements or rollers contact with the internally spherical surface of the member $h$ and driving engagement between such gripping elements and the spherical surface is assured by the pressure between the two developed by endwise pressure on the shaft $a$, which in turn is due to the action of the balls or rollers $d^4$ in the tapered recesses $d^3$ formed in the flanges $a^3$ and $d^2$. The tendency of the spring $e^3$ is to press the flange $d^2$ toward the flange $a^3$ and therefore to increase the pressure between the spherical bearing $h$ and the gripping elements $k$, but such pressure is not dependent upon the torque and is not relied upon to secure driving engagement. The action of the balls $d^4$ in the tapered recesses $d^3$ is in degree dependent upon the torque and therefore is relied upon to press the spherical bearing member $h$ toward and upon the gripping elements and by the pressure developed to maintain driving engagement.

The frame $i$ is fixed to a spindle $i'$ which is mounted in a yoke $l$ hung on trunnions $l'$ supported in the casing $c$ and receiving, externally to the casing, a crank arm, not necessary to be shown, by which the yoke $l$ can be oscillated about an axis transverse to the axis of the shaft $a$ and therefore to produce the relative angular axial displacement of the gripping elements with respect to the spherical bearing surface which is necessary to effect the change of speed, as fully explained in said Letters Patent. It is sufficient here to point out that when the parts are in the positions shown in Figure 1, the frame $i$ rotates at the same speed as the spherical bearing surface $h$, whereby the maximum speed is imparted to the driven member, and that with the parts in the position shown in Figure 3, the frame $i$ receives no motion of rotation and the speed of the driven member is zero.

It will be understood that the body $i$ and therefore the axis of the spindle $i'$ has a movement, the amplitude of which depends upon the extent to which the yoke or carrier $l$ is rocked on its own axis, and that the spindle $i'$ at the same time rotates on its own axis with a speed of rotation varying from zero to the maximum. In the patents above mentioned several different forms of mechanism for transmitting to the driven shaft the rotation, at variable speed, of the nutating body on its own axis are described. In the present case there is provided for this purpose a mechanism which is simpler in construction, develops less friction in operation and is more efficient. This mechanism, which is capable of use for other purposes than that for which it has been developed, comprises a gear like member $m$ fixed on the spindle $i'$, a gear $m'$ meshing with the gear like member $m$ and, in the embodiment of the invention shown, carried by the short shaft $m^2$, a gear like member $m^3$ on the other end of the short shaft $m^2$, and a gear like member $m^4$ on the driven shaft $m^5$. The shaft $m^2$ is carried by a sleeve $n$, which is made in two parts for convenience in assembling and is pivoted to the yoke $l$ on an axis parallel with the axis of the yoke $l$ and tangential to the pitch line of the gear like members $m, m'$. At the other end the sleeve or carrier $n$ is pivoted to a yoke $o$ carried by a sleeve $o'$, which is held from rotation in the casing $c$ but is free to move longitudinally to a limited extent, the pivotal axis also being parallel with the axis of the yoke $l$ and tangential to the pitch line of the gear like members $m^3$ and $m^4$. The shaft $m^5$ is also free to move longitudinally to a limited extent. It will be observed further that the pivotal axes of the sleeve or carrier $n$ are on opposite sides of the axis of the shaft $m^2$. The teeth of the several gear like members $m, m', m^3$ and $m^4$ are suitably shaped so that they mesh properly in all angular positions of the shaft $m^2$ between that shown in Figures 1 and 2 and that shown in Figure 3, the sleeve or carrier $n$ being moved on its pivots and the shaft $m^5$ and sleeve $o'$ sliding to accommodate such movements, as the yoke $l$ is rocked on its axis to displace the gripping elements with respect to the spherical driving surface $h$. It will be noted that this construction permits a movement of the body $i$ not only through an angle of 90°, from the position shown in Figure 1 to that shown in Figure 3, but the movement of the yoke $l$ of more than 90° or beyond the position shown in Figure 3, to an extent limited by the formation of the parts, so that the construction permits the device to be used also as a variable speed reversing device. At slow speed the extent of engagement of the intermeshing pairs of gears is minimum, while at high speed the extent of engagement is maximum.

In the construction shown in Figures 6 and 7 the nutating body $i$, with its gripping rollers $k$, is replaced by a cup-shaped body $i^2$ secured to the spindle $i'$ which is mounted as before in the yoke $l$, the cup-shaped body $i^2$ has a spherical gripping surface $i^3$ for co-operation with the spherical bearing surface $h$ and the axis of the trunnions $l'$ of the yoke $l$, as clearly shown in Figure 7, is eccentrically disposed with respect to the axis of the shafts $a$ and $m^5$, so that the spherical bearing surface $i^3$ of the body $i^2$ shall be in in contact with the spherical bearing surface $h$ theoretically at a point only. The operation of this embodiment of the invention is the same as that already described and as set forth in the patents above mentioned.

In the embodiment of the invention illustrated in Figure 8 the form of the means for securing pressure between the body $c$ and the spherical bearing surface proportionate to the torque is somewhat different from that shown in Figure 1, although the principle of operation is the same. In this construction the shaft $a^5$, which has the member $h$ secured thereto and formed therewith and is capable of limited longitudinal movement, is formed with a shoulder $a^6$ in which are formed parts $a^7$ of the tapered recesses in which function the balls or rollers $d^5$. A sleeve $d^6$, flanged as at $d^7$, has formed in its end the other parts $d^8$ of the tapered chambers which receive the balls or rollers $d^5$. The sleeve $d^6$ is pressed forward normally by a spring $d^9$ which encircles the shaft $a^5$ between a shoulder $d^{10}$ of the sleeve and a collar $a^8$ seated in a groove $a^9$ of the shaft $a^5$. A sleeve $b^2$, threaded exteriorly to engage an internal thread $c^3$ formed in the neck of the casing $c$, has an internal flange $b^3$ received between one of the bearings $b^4$ which abuts against a shoulder $d^{11}$ of the sleeve $d^6$, and a collar $d^{12}$, seated in a groove $d^{13}$ of the sleeve $d^6$ and can be rotated by a suitable lever $b^5$ to move the sleeve $d^6$ and the shaft $a^5$ away from the casing sufficiently to reduce the pressure between the body $c$ and the spherical bearing surface to zero, such movement having the effect of opening the driving clutch. In operation, however, the shaft $a^5$ and the spherical bearing surface $h$ are thrust forward to increase the pressure and the driving engagement between the body $h$ and the body $c$, in proportion to the torque, by the functioning of the balls or rollers $d^5$ in the tapered chambers or recesses, substantially as in the construction shown in Figure 1.

It will be understood that various changes in details of construction and arrangement may be made to suit different conditions of use and that the means for regulating the driving engagement between the co-acting elements and the means for transmitting motion from the driven member to the driven shaft are capable of independent use. The invention, therefore, is not limited to the precise construction and combination of parts shown and described herein, except as pointed out in the accompanying claims.

I claim as my invention:

1. A power transmission device comprising a support, a rotating body supported thereby, a second rotating body having a spherical bearing surface for co-operation with the first mentioned body, a shaft carrying said second rotating body, a rotatable sleeve member, said shaft and said sleeve member being formed with opposed surfaces with tapered recesses and rollers in said recesses.

2. A power transmission device comprising a support, a rotating body supported thereby, a second rotating body having a spherical bearing surface for co-operation with the first mentioned body, a shaft carrying said second rotating body, a rotatable sleeve member, said shaft and said sleeve member being formed with opposed surfaces with tapered recesses, rollers in said recesses, a second sleeve having a screw threaded engagement with the casing and having operative engagement with the first mentioned sleeve whereby longitudinal movement of both sleeves together is assured, and relative rotation of the two sleeves is permitted, and means to rotate the second mentioned sleeve.

3. A power transmission device comprising a support, a rotating body supported thereby, a second rotating body having a spherical bearing surface for co-operation with the first mentioned body, a shaft mounted in the support and carrying the second rotating body, a sleeve surrounding said shaft, said sleeve and shaft having opposed faces formed with tapered recesses, rollers in said recesses, and a spring interposed between an abutment on said sleeve and an abutment carried by said shaft and tending to press said opposed faces of the shaft and sleeve toward each other.

4. A power transmission device comprising a support, a driving shaft mounted therein and carrying a rotating body having an internal spherical bearing surface, a driven shaft mounted in said support in line with the driving shaft, a yoke mounted in said support on an axis transverse to the axis of the driving shaft and capable of being rocked thereon, a spindle carried by said yoke, a second rotating body carried by said spindle in driving engagement with said spherical bearing surface, and transmitting devices between said spindle and said driven shaft.

5. A power transmission device comprising a support, a driving shaft supported therein and carrying a spherical driving body, a driven shaft supported in the support in line with the driving shaft, a yoke mounted in the support on an axis transverse to the axis of the driving shaft and capable of being rocked thereon, a spindle carried by said yoke, a rotating body carried by said spindle in driving engagement with said driving body, gear-like members on the adjacent ends of said spindle and said driven shaft, a shaft having at its ends gear-like members in mesh respectively with said first mentioned gear-like members, a second yoke supported by the support and a carrier for said last mentioned shaft, said carrier being pivotally connected to the first mentioned yoke on an axis tangential to the pitch line of the corresponding gear-like members and pivoted to the second mentioned yoke, on the opposite side of the axis of the driving shaft and driven shaft, on an axis tangential to the pitch line of the corresponding pairs of gear-like members.

This specification signed this 6th day of March A. D. 1920.

CARL W. WEISS.